United States Patent [19]

Emmett, Jr. et al.

[11] 4,096,053
[45] Jun. 20, 1978

[54] SLURRY ELECTROWINNING APPARATUS

[75] Inventors: Robert C. Emmett, Jr., Salt Lake City, Utah; James K. Dicksa, Antioch, Calif.; Bruce C. Wojcik, Salt Lake City; Frank A. Baczek, Sandy, both of Utah

[73] Assignee: Envirotech Corporation, Menlo Park, Calif.

[21] Appl. No.: 759,960

[22] Filed: Jan. 17, 1977

Related U.S. Application Data

[62] Division of Ser. No. 719,867, Sep. 1, 1976, Pat. No. 4,066,520.

[51] Int. Cl.² .................... C25C 1/12; C25C 7/00
[52] U.S. Cl. ................... 204/238; 204/108; 204/273; 204/276; 204/222; 75/6
[58] Field of Search ......... 75/101, 103, 117, 6; 423/34, 36; 204/108, 277, 238, 273, 276, 222

[56] References Cited

U.S. PATENT DOCUMENTS

| 1,580,614 | 4/1926 | Laist et al. ................ 204/108 |
| 3,515,512 | 6/1970 | Skarbo ........................ 423/34 |
| 3,728,430 | 4/1973 | Clitheroe ................... 75/101 R |
| 3,959,112 | 5/1976 | Arend, Jr. ................. 204/277 X |

*Primary Examiner*—John H. Mack
*Assistant Examiner*—D. R. Valentine
*Attorney, Agent, or Firm*—William S. Bernheim; Robert E. Krebs

[57] ABSTRACT

Apparatus for continuous electrowinning of copper bearing slurries, including an electrowinning cell wherein a slurry composed of a suitable electrolyte and a copper-bearing solid material, is subjected to the simultaneous reactions of dissolving the copper material and plating out elemental copper as a relatively pure copper product. The apparatus and process also includes means to purify the copper-bearing material before passage to the electrowinning cell so as to prevent contamination of the electrolyte in the cell and, also, a means to recover sulfur which is released during the electrowinning and unreacted copper material.

10 Claims, 7 Drawing Figures

SLURRY ELECTROWINNING APPARATUS

This is a division of copending application Ser. No. 719,867, filed Sept. 1, 1976, now U.S. Pat. No. 4,066,520.

BACKGROUND OF THE INVENTION

1. Field of the Invention

The invention relates to an apparatus and process for continuous electrowinning of copper-bearing slurries.

2. State of the Art

Present commercial methods of electrowinning copper to produce a high purity copper product have several drawbacks. Preparatory to electrowinning, an output of a conventional copper ore mill must be placed into solution by appropriate leaching methods, which may require special equipment and conditions. The solution must then be separated from the residual solids and clarified as well as purified of harmful soluble components, especially metal ions other than copper. Subsequently, the solution can be subjected to electrowinning in an electrowinning cell only under conditions allowing use of relatively low current density and requiring recovery of residual copper in the electrolyte leaving the cell. As a result, present methods are equipment and energy intensive.

The present electrowinning methods also fail by producing oxygen at the anode to use the anodic reaction efficiently. The energy expended in the oxidizing of oxygen is lost to the system.

U.S. Pat. No. 3,806,434 discloses an electrowinning cell for electrowinning copper-bearing slurries but does not disclose a leach stage or recovery stage both of which are utilized in the present invention to allow continuous operation. In the cell disclosed a complex mechanical agitation is utilized which is undesirable from a maintenance standpoint.

OBJECTS OF THE INVENTION

It is an object of this invention to provide a system to electrowin a slurry of copper-bearing material in an electrowinning cell to produce a copper product suitable for most copper market purposes.

It is also an object to provide a simple leaching stage preceding electrowinning to solubilize undesirable components from an electrowinning standpoint while precipitating any copper present to allow the use of conventional solid-liquid separation techniques in preparing the copper-bearing material for electrowinning.

It is another object to be able to utilize in the electrowinning cell a portion of the energy normally expended at anodes during electrowinning to bring about simultaneous dissolution of the copper-bearing material. The cell is also designed to utilize high current flows and to minimize the mechanical agitation needed as a way of simplifying maintenance.

It is a further objective to utilize copper concentrate output from conventional ore mills as the copper-bearing material entering the leaching stage and achieve a copper recovery of about 99%.

It is yet another object to provide a recovery system to recover the sulfur normally associated with the copper-bearing material and utilize such sulfur to generate sulfur gases and acids consumed in the system.

BRIEF DESCRIPTION OF THE DRAWINGS

The following specification and the accompanying drawings show and describe a preferred embodiment of this invention and various modifications thereof; but it is to be understood that these are not intended to be exhaustive nor limiting of the invention, but on the contrary are given for the purpose of illustration in order that others skilled in the art may fully understand the invention and the principles thereof and the manner of applying it in practical use so that they may modify and adapt it in various forms, each as may be best suited to the conditions of a particular use.

In the drawings.

DETAILED DESCRIPTION OF THE PREFERRED EMBODIMENT

The system of the present invention includes three major stages each of which contains novel aspects. The three stages are a leaching stage to prepare a feed of copper-bearing solids for electrowinning in which certain undesirable components of the feed are leached therefrom; a winning stage, in which an electrowinning cell is used to simultaneously leach copper into electrolyte from the solids and to electrowin elemental copper from the electrolyte while allowing the electrolyte to be recovered; and a recovery stage in which sulfur released in the electrowinning is recovered for use in the system and copper values leaving the winning stage are recycled to the leaching stage. The system set forth is designed for continuous operation but with some modification can be adapted for batch operation.

One purpose of the leaching stage is to prepare the copper-bearing solids for electrowinning by removing certain components, mostly metal ions, which could, if otherwise present, build up in the electrolyte, resulting in lower copper plating purities and lower current efficiencies. Another purpose is to carry out the above preparation in a manner allowing the use of conventional solid-liquid separation techniques to remove the above components in a liquid portion with acceptable copper loss.

Figure 1:
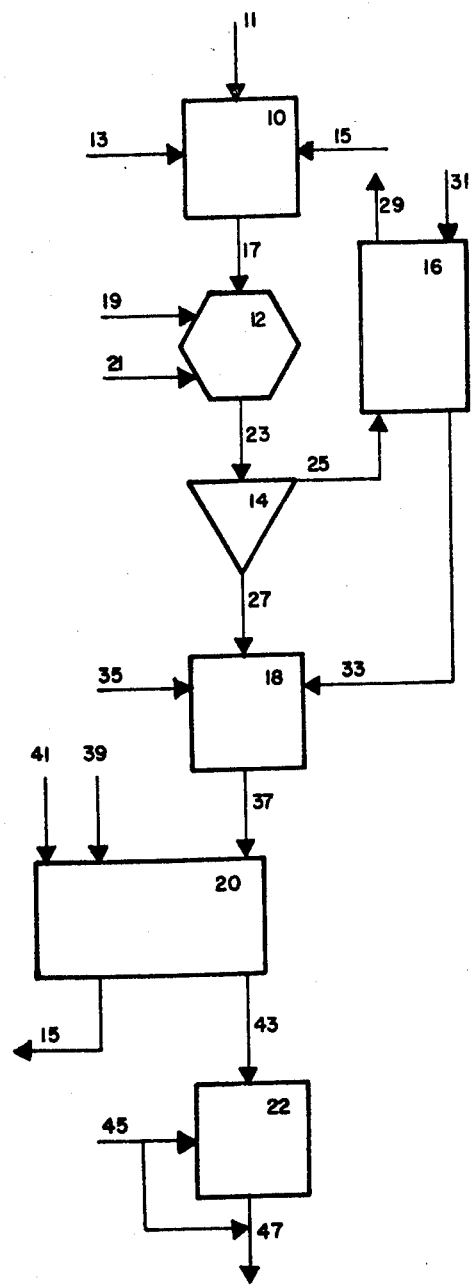
FIG. 1 is a schematic illustration of a leaching stage according to the present invention.

In the leaching stage in FIG. 1, a copper-bearing feed is conveyed via line 11 to an acid leach tank 10. The feed is normally an aqueous slurry of about 60% by weight solids, addition of water or evaporation can normally be used to reach this concentration of which 15–50%, preferably about 35% is copper. Additional copper can be in solution in the feed slurry. A feed solids particle size allowing the slurry to pass through a mesh screen of about 100 Mesh is preferred. Particles of larger size are harder to leach. An acceptable feed slurry can be produced from chalcocite type ore including chalcopyrite ore as a minor component and copper precipitate.

The output of most conventional copper ore mills can be utilized as the feed to the leaching stage. In a conventional copper ore mill, raw ore averaging from 0.3% to 1% copper is typically processed by grinding, flotation and thickening to yield a slurry of about 60% by weight solids of which about 35% is copper.

In addition to the copper-bearing feed, a moderately strong, aqueous acid is fed via line 13 to the leach tank 10. The purpose of the aqueous acid is to leach (i.e., solubilize) metal ions, primarily magnesium, aluminum and iron from the copper-bearing solids without solubilizing copper and preferably to precipitate copper ions from the slurry solution. These metal ions, if allowed to remain in the system in significant quantities, would adversely affect the winning stage by decreasing the purity of copper plate or by increasing the power consumption by reducing current efficiency. Preferably the aqueous acid is provided by reacting sulfur dioxide gas with water in the feed slurry to produce sulfurous acid. A certain amount of the sulfurous acid can also be oxidized by copper in solution which converts the sulfurous acid to sulfuric acid or stronger leaching acid and converts the copper ion to elemental copper which leaves solution. As with sulfurous acid, it is preferred that a portion of the leaching acid be an oxidizable acid in order to convert copper in solution to elemental copper. Most copper ores and concentrates contain some copper present as an oxide mineral which is acid soluble under the above conditions and which must be precipitated in the next step.

Also added to leach tank 10 to allow repeated leaching and to provide a bleed stream to remove metal ions released elsewhere in the process, is a liquid stream (line 15) from a solidliquid separation means 20 discussed infra.

Certain leach tank conditions in terms of pH, redox potential and temperature are preferred when utilizing sulfur dioxide as the leaching acid. In the leach tank 10 and pH should be in the range of about 2.5-4.5, the redox potential in the range of +60 to +300 millivolts, referred to a standard calomel cell and the temperature in the range of 50°-90° C. The sulfur dioxide, when reducing copper, is oxidized to sulfuric acid which in turn by lowering the pH causes the leaching reaction to slow down. The practical minimum dissolved copper ion concentration in leach tank 10 by addition of sulfur dioxide and its oxidation to sulfuric acid is about 5 grams/liter, too high from a copper recovery standpoint to allow discarding of the liquid portion of the aqueous slurry.

Further, according to the system in FIG. 1, aqueous slurry is fed through line 17 from leach tank 10 to a precipitator tank 12. Calcium sulfite is also fed to the precipitator tank, as shown by line 19, in sufficient quantities to provide a concentration of about 10-50 grams/liter in the slurry. With a pH between about 1.8 and 4.5 in the tank 12, the calcium sulfite rapidly precipitates copper from solution to reduce the copper ion concentration to below 1 gram/liter preferably below 0.2 gram/liter. Suitable calcium sulfite is readily available as the by-product of a $SO_2$ scrubbing system.

To control pH in the precipitator tank 12, basic substances such as calcium hydroxide, calcium carbonate, sodium hydroxide, can be added via line 21. Typically, some basic substances will be included in the feed slurry to leach tank 10 and those substances will provide enough neutralization that little or no additional pH control will be required.

Typically, the aforedescribed process results in the precipitation of more than 99% of the solubilized copper from the leach feed 11 thereby allowing a conventional solid-liquid separation to be utilized to discard undesirable metal ions solubilized in the liquid and reduce the liquid burden. These two steps of which the second and the combination thereof is novel can also be substituted for scrap iron recovery of copper as practiced in present acid leach plants.

Several solid-liquid separation means are utilized in the present invention. From slurries the separations produce first streams of clear liquid and second streams of more concentrated slurry. The extent of dewatering desired in the second stream varies and therefore the preferred separation means varies although substitution of one separation means for another is generally possible.

Line 23 carries slurry, including precipitated solids from the precipitator tank 12 to a conventional thickener 14 which separates an overflow stream of clear liquid containing solubilized metal ions which, via line 25, is discharged from the process and an underflow stream, comprising concentrated slurry which is fed through line 27 to a leach tank 18 for a leaching with a strong acid. The volume of liquid in the underflow stream is minimized to reduce the quantity of acid added in the second leaching.

Since process upsets can occur and soluble copper may still be present in the overflow stream, it is preferable to further process the overflow through an ion exchange or solvent extraction recovery system, represented in FIG. 1 by an ion exchange column 16 to which the overflow stream is fed via line 25. A resin or solvent recovers the soluble copper present, and the treated overflow stream via line 29, essentially free of copper, can be discarded. The resin is eluted with a sulfuric acid stream fed via line 31 to the ion exchange column 16 and thereafter fed via line 33 to the second leach tank 18 as the leaching acid.

The dissolved components in the clear overflow from the thickener 14 include magnesium, aluminum, iron, sulfate and ammonium ion (from flotation reagents added later in the system as well as from reagents present in the feed slurry to leach tank 10). Preferably the pH of the solution in the thickener 14 is in a range of about 1.8-3.0, indicating the presence of very little free acid, and hence reducing the neutralizing requirement for the thickener overflow stream.

In a second leach tank 18 a strong acid such as hydrochloric but preferably concentrated sulfuric acid is added via line 33 to the thickener underflow which enters via line 27 to produce a pH below about 2 and preferably about 1. The strong acid solubilizes additional undesirable metal ions from the solids. The slurry is agitated in tank 18 by paddles or the like at a temperature of about 60°-95° C maintained with heating and then fed via line 37 to a conventional solid-liquid separation means 20, such as a rotary drum filter or centrifuge. The copper will be resolubilized in tank 18 to the extent of copper precipitated as a hydroxide and such solubilized copper is recycled in the liquid stream from the separation means 20 via line 15 to leach tank 10, and not lost from the process.

Preferably, the solid-liquid separation means 20 is a filter including two washing steps. The first wash is accomplished with acid water of about pH 2 introduced to the filter 20 via line 39. The second wash is accomplished with the liquid portion of a solid-liquid separation means 30 (FIG. 2) located in the winning stage and is introduced via line 41. The liquid introduced through line 41 is used for the purpose of reducing the dilution of electrolyte in the winning cells by fresh water which would otherwise be used for the washing. This second wash via line 41 is for energy economy and is optional. Filtrate, i.e., the liquid portion from the filter 20 is recycled via line 15 to the leach tank 10 and, because of the recycle, any copper solubilized in the second leach tank 18 or carried in streams 33, 35 or 41 is not lost from the system. The filter cake, i.e., the concentrated solid portion from the filter 20, is suitable for introduction to the winning stage upon being aqueously reslurried.

In the system in FIG. 1, the solids are reslurried with highly acidic electrolyte, preferably sulfuric acid to a strength of about 100 grams/liter. For this purpose the cake is fed via line 43 to a reslurrying or "repulping" tank 22 to which the electrolyte is added via line 45. The electrolyte is a part of the liquid portion from a solid-liquid separation means 28 (FIG. 2) within the winning stage which will be described hereinafter. The reslurried solids are discharged from the repulper 22 via line 47 and comprise the feed to the electrowinning stage which will now be described.

In the electrowinning stage, the output of the aforedescribed leaching stage is fed to one or more electrowinning cells in series. In the cells, copper is leached into the electrolyte from the feed solids and then plated out onto a cathode member.

Figure 2:
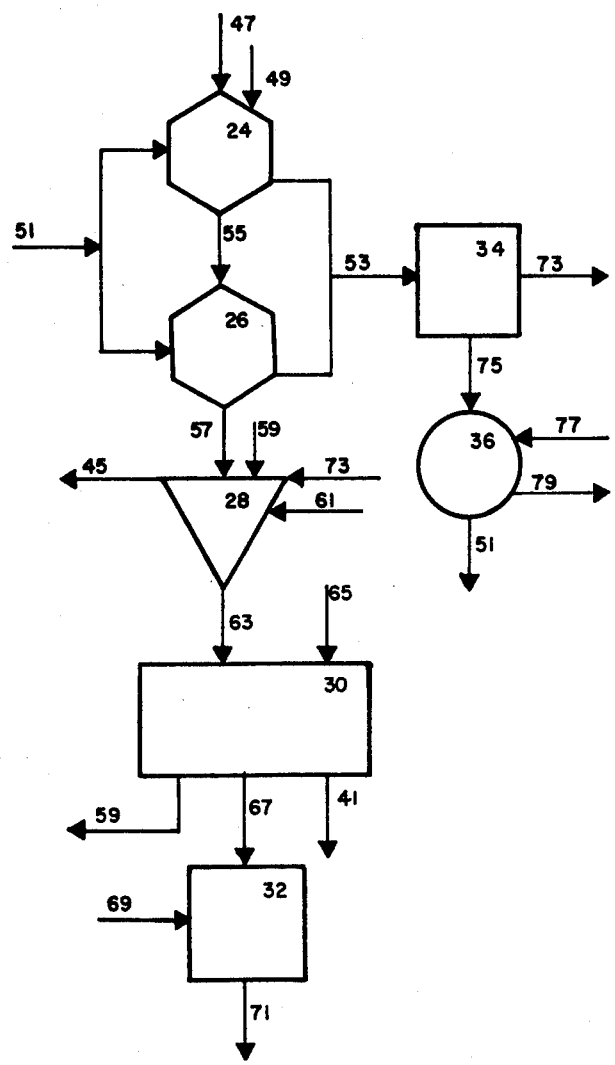
FIG. 2 is a schematic illustration of a electrowinning stage according to the present invention.

In the winning stage embodiment shown in FIG. 2, the aforementioned winning feed slurry is fed to a winning cell 24, a preferred embodiment of which will be described later with reference to FIGS. 4–7. In the winning cells the winning feed is distributed to fill spaces between a plurality of paired cathodes with anodes designed for high current flow. Agitation is provided to the filled spaces.

At the cathode, the reaction is primarily one of reduction of cupric ion to elemental copper as a plate on the cathode. At the anode the reaction is primarily one of oxidizing ferrous ion to the ferric state, $Fe^{+++}$, which is a strong leaching agent for dissolving the chalcocite mineral, or, in the case of copper precipitate process, dissolving the elemental copper and in leaching is converted back to ferrous ion. To some extent, direct dissolution of the copper solids can occur upon contact with the anode surface.

The slurry in the cells 24 and 26 preferably has a solids particle size allowing passage through a 100 Mesh screen. The suspended solids of the slurry are in the range of about 1.5–20% by weight, with a preferred range of about 6–12%. The range is determined largely by the fluidity of the slurry, with thicker slurry making suspension of the solids more difficult and increasing the power expenditure unfavorably.

The liquid in the cells serves as the electrolyte and has as its major components ferrous sulfate, ferric sulfate, copper sulfate and sulfuric acid. A small quantity of chloride ion is present as a useful additive.

The maximum concentration in the liquid for the soluble metal ions of magnesium and aluminum is about 5 grams/liter although higher amounts can be tolerated at the expense of power and reagent usage. The preferred sulfuric acid concentration in the cells is about 100 grams/liter with an acceptable range of about 70–150 grams/liter. The ratio of soluble copper ion to total ferrous and ferric ion is in the range from about 3-1 to 1.6-1 and is preferably about 1 to 1. The ferric ion concentration is in the range of about 1–8 grams/liter. The ferrous ion concentration is in the range of about 15–35 grams/liter with the ratio of ferrous to ferric ion in the range of 15-1 to 3½-1 preferably about 9-1. The ferric ion concentration varies inversely with the amount of copper-bearing solids present. Because the ferrous and ferric ion in the winning feed slurry is being recycled the ferrous and ferric ion added to the winning cells is limited to providing makeup for losses.

Chloride ion is also provided in the electrolyte to yield a cell concentration of 30–350 ppm with 30–200 ppm being preferred for copper precipitate feed and with 150–350 ppm being preferred for chalcocite feed. The chloride ion improves the quality of copper plating and also improves copper extraction and electrical current efficiency by allowing the $Fe^{+++}$ to react more readily with the chalcocite. Makeup chloride ion is added as necessary to winning cell 24 via line 49 either as a salt such as sodium chloride or hydrochloric acid. Makeup ferrous and ferric ions as sulfates can also be added via line 49.

Agitation within the winning cells is important to obtaining good plating and dissolution of the copper-bearing solids. The agitation serves to keep the solids in suspension and to scrub the cathodes and anodes. The scrubbing action improves the electrolytic deposit at the cathode and increases current efficiencies. The amount of agitation is important as excessive agitation will result in less copper deposit and reduced current efficiency, as well as localized etching of the cathode deposit, while insufficient agitation can produce a dendritic or powdery deposit which will entrap impurities. The agitation can be provided mechanically with mechanical agitators between the plates, hydraulically by pumping the slurry between the plates, or aerodynamically by bubbling gas between the plates.

In the illustrated system, agitation of electrolyte within the cells is provided by introducing gas between the facing anode and cathodes. The agitating gas, preferably air, is delivered in the form of bubbles emitted from aeration nozzles or orifices located below the electrode plates having tip openings of about 0.01 to 0.05 inches in diameter and delivered at a sufficient pressure to overcome head losses generally 2 to 20 psig. In the cells the zone requiring agitation is the horizontal area between facing anodes and cathodes described by the gap between the anode and cathode filled with electrolyte multiplied by the width of the cathode face. In other zones of the winning cells, agitation is sufficient if the feed solids are in suspension. The agitation needed between electrodes is provided by about 100–1,000 cubic feet/hour of gas per foot of gap per foot of cathode width.

Recirculation of slurry with or between cells achieves solids suspension and good mixing. A recirculation rate replacing the cell slurry volume every 3 to 30 minutes, preferably 7 to 15 minutes is utilized.

In operation winning feed is fed via line 47 to the primary winning cell 24. From the primary winning cell 24 the winning feed reduced in copper value is fed via line 55 to the secondary winning cell 26 from whence the winning feed further depleted in copper is fed via line 57 to the solid-liquid separation means 28.

The cells are provided with agitation gas via line 51. After passing through the slurry the agitation gas is drawn from the cells for recycling via line 53 which feeds a gas-liquid separation means 34. Suitable as separation means 34 is a conventional mist eliminator, the liquids being sent via line 73 to the solid-liquid separation means 28 and the gas being sent via line 75 to a centrifugal compressor 36 or like means for repressurization. Makeup gas can be added to the compressor 36 via line 77 or excess air removed via line 79 and sent to a scrubber not shown for discharging. The repressured gas is fed into line 51 for passage to the cells. Recycling the agitation gas without cooling is preferred as heat loss from the cells can be avoided.

The winning cells are operated at temperatures in the range of about 60° C to the boiling temperature of the slurry preferably in the range of about 80°-90° C with heat provided as necessary. The cells are provided with an electrical potential means which allows a voltage to be applied across the gap between facing cathodes and anodes to provide in the primary cell 24 approximately 1620 amps/square meter of cathode and in the secondary cell 26 approximately 1080 amps/square meter of cathode.

The use of the secondary winning cell 26 allows higher current densities with efficiency to be utilized in the primary winning cell 24 by reducing the difference in copper content between the winning feed and the average in the cell slurry. If desired, additional cells can be placed in series with the cells 24 and 26 in order to increase the total extraction of copper per passage through the cells thus reducing the amount of copper bearing solids to be recycled to the cells. Approximately 85% of the copper originally present in the leach feed 11 is removed from the slurry before it leaves the electrowinning cells.

Line 57 carries the discharged winning slurry to a solid-liquid separation means 28 which separates the solids from the electrolyte without significant dilution to allow reuse of the electrolyte. Preferably the separation means 28 is a thickener which separates a stream of clear liquid mostly electrolyte which is conveyed via line 45 to the repulper 22 and to line 47 and an underflow stream of slurry containing solids depleted in copper. Also fed to the separation means 28 are the liquids from the mist eliminator 34 via line 73, water as needed via line 61, and a recycle stream from the next step of the process via line 59.

The underflow via line 63 is conveyed to another solid-liquid separation means 30 whose purpose is to complete the recycle of the liquids of the winning slurry. Preferably the separation means 30 is a filter equipped with a multi-stage counter-current washing system, such that approximately one wash displacement can be applied and at least 99% of the solution recovered. Rather than added back into the system directly, the wash displacement filtrate via line 41 is used as the final wash on the filter 20 of the leaching stage.

To this point in the processing through the leaching and winning stages there has been no significant increase in the liquid phase of the slurry in the winning stage. A wash displacement as used in filter 20 of the leaching stage is not perfect, and a small amount of this wash applied via line 41 in the filter 20 will pass via line 15 to be recirculated to the leach tank 10. However, any copper that is present will be recycled by the copper precipitation used in the leaching stage and the wash passing to leach tank 10 serves as minor bleed stream from the electrolyte thereby preventing build-up of undesirable soluble components in the electrolyte not previously removed in the leaching stage.

The filter cake from the filter 30 is suitable for introduction to the recovery stage upon being aqueously reslurried. For reslurring the cake is fed via line 67 to a repulper 32, to which water, preferably of pH 2 is added via line 69. The reslurried material is fed via line 71 to the recovery stage.

In the recovery stage the output of the aforesaid electrowinning stage is treated to recovery any unrecovered copper and sulfur freed during the electrowinning. After treatment the remaining solids are discharged from the process.

Figure 3:
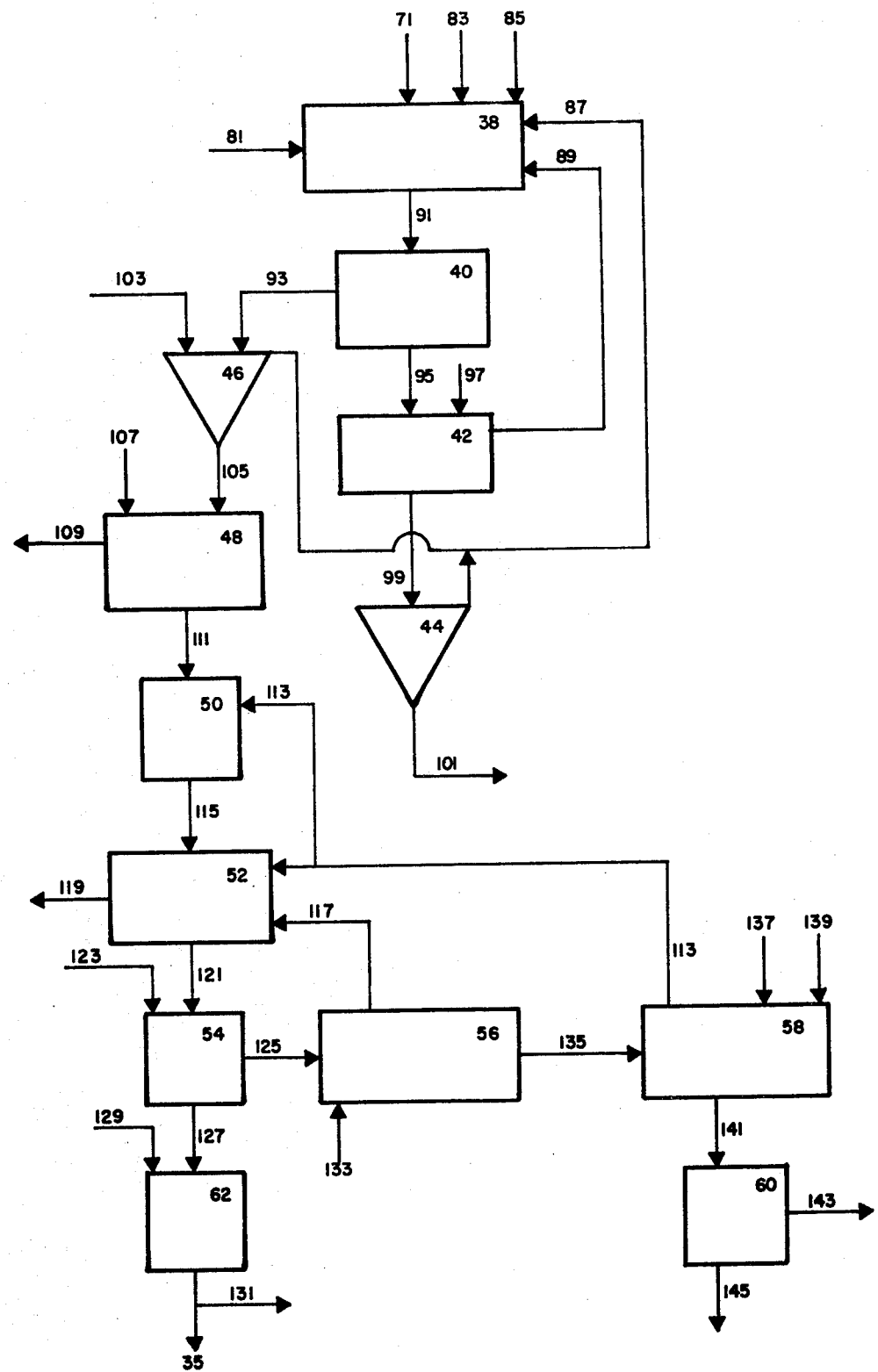
FIG. 3 is a schematic illustration of a recovery stage according to the present invention.

The recovery stage, in FIG. 3, begins with a conditioner tank 38 to which the reslurried material from the repulper 32 is fed via line 71. Conventional copper and sulfur flotation techniques are used in the conditioner tank 38 and include adding collector reagents such as xanthates or thionocarbamates, and frother agents via lines 81 and 83 respectively. Iron powder or similar copper precipitant is added via line 85 to recover any soluble copper which may not have been recovered in the filtrate of filter 30. Two recycle streams from points in the recovery stage are also fed via line 85 and 89 to the conditioner tank 38.

At a pH of about 2, normally encountered in the conditioner tank 38 as a result of the reslurry water, copper salts are soluble and the iron will precipitate the copper in solution. The conditioned slurry prepared in the conditioning tank 38 is thereafter fed via line 91 to a separating means for which a float cell 40 is suitable. A split of reaction mixture is made in float cell 40 between an overflow stream 93 which floats sulfur and any remaining copper solids and an underflow stream 95 containing the remaining solids.

The underflow stream via line 95 along with additional collector and frother agents added via line 97 are fed to a float scavenger cell 42 where a second float separation of the solids is made. However, this scavenger cell 42 can be omitted if effective recovery of copper and sulfur is achieved by the first float separation. The floated solids of scavenger cell 42 are recycled via line 89 to the conditioner tank 38. The underflow line is fed via line 99 to a thickener 44 which concentrates the waste solids for discarding after neutralization as an underflow which is recycled via line 87 to the conditioner tank 38.

The float stream from the float cell 40 containing sulfur and copper is fed via line 93 to a solid-liquid separation means for which a thickener 46 is preferred. Additional spray water is added to the thickener 46 as needed via line 103 to break down any residual foam generated by the reagents. The thickener's purpose is to reduce the liquid burden.

The thickener 46 overflow, a clear liquid, is recycled via line 87 to the conditioner tank 38. The underflow stream from the thickener 46 is fed via line 105 to a solid-liquid separation means for which a filter 48 is preferred. Wash water is added to filter 48 via line 107. The filtrate stream from the filter 48 can serve via line 109 as a source of pH 2 water throughout the recovery stage and to repulper 32 (FIG. 2) in the winning stage. The filter cake is fed via line 111 to a repulper 50. As repulping liquid a portion of a filtrate from a final sulfur filter 58 described infra is added via line 113. The slurried material from the repulper 50 is fed via line 115 to a sulfur leach agitator 52.

In the sulfur leach agitator 52 the sulfur and copper are separated by dissolving the sulfur. The agitator 52 operates under a slight vacuum which draws off excess vapors via line 119 and provides a pressure differential to draw gases including ammonia and hydrogen sulfide generated in an evaporator tank 56 described infra via line 117 through the slurry in agitator 52 in order to condense the ammonia and hydrogen sulfide therein and form with the sulfur, soluble ammonia polysulfides. Also added via line 113 to the agitator 52 is a portion of the filtrate from the sulfur filter 58. The reaction within the agitator 52 between the gases and slurry is exothermic and cooling is necessary to maintain preferred operating temperatures in the range of about 20°–40° C.

The slurry from the agitator 52 is fed via line 121 to a solid-liquid separation means preferably a filter 54. Wash water is added to the filter 54 via line 123. The filter 54 makes a conventional solid-liquid separation with the sulfur in the form of ammonium polysulfides in the liquid and the copper solids as the cake.

The filtrate is fed via line 125 to an evaporator tank 56. Steam or other source of heat is added to the evaporator tank 56 via line 133 to break down the ammonium polysulfides into ammonia gas and hydrogen sulfide gas which are fed via line 117 without condensing back to agitator 52 and elemental sulfur which passes to a solid-liquid separation means preferably a final filter 58 via line 135. The ammonia, hydrogen sulfide, ammonium polysulfide cycle between agitator 52, filter 54 and evaporator tank 57 without condensing the gases leaving tank 56 before their introduction to the agitator 52 is novel.

The final filter 58 further concentrates the sulfur. Air and steam are added to the filter 58 via lines 137 and 139 respectively to assist in dewatering the sulfur and to produce the filtrate stream which is split via line 113 as feed to the repulper 50 and agitator 52. A sulfur rich cake leaves the filter 58 and is fed via line 141 to a furnace 60 to generate sulfur dioxide gas which can be used in tank 10 via line 13 or to make sulfuric acid to be used elsewhere in the system. By-product ash is produced by the furnace and can be discarded from the process via line 145.

The filter cake of filter 54 containing the copper solids is fed via line 127 to a repulper 62 for reslurring with acidic water added via line 129. The reslurried copper solids are preferably returned to the strong acid leach in tank 18 in the leaching stage via line 35, although the solids can re-enter at other points as well. A portion of the stream in line 35 can be bled via line 131 for precious metal recovery. Approximately 15% of the original ore is recycled in this manner.

In the processing of copper precipitate, the leaching stage is not required because the raw material is essentially copper with acceptable minor amount magnesium, aluminum and iron. However, a certain amount of coarse precipitating agent (usually scrap iron) will be present, and our process will employ a screening step, using a screen in the range of 28–150 Mesh to remove any coarse material present. The material passing through the screen can then be introduced into the winning stage via line 47 or via line 37 to a filter 20 and treated thereafter accordingly. The electrolyte becomes contaminated slowing with an excess of ferric and ferrous ion when processing copper precipitate, and a relatively small bleed stream of electrolyte will be required to eliminate such excess.

Figure 4:
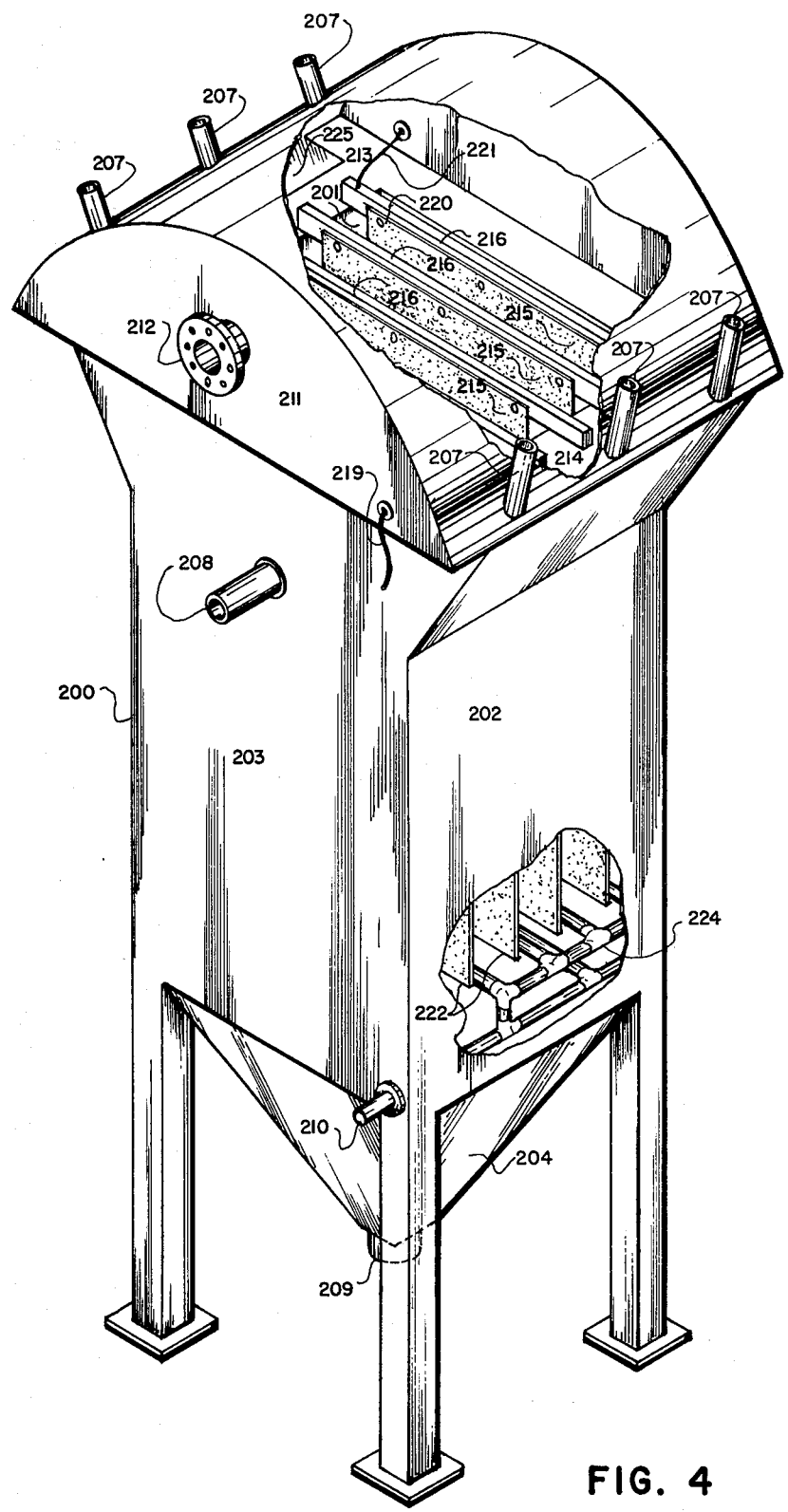
FIG. 4 is a pictorial view partially cutaway for purposes of illustration of an electrowinning cell according to the present invention.
Figure 5:
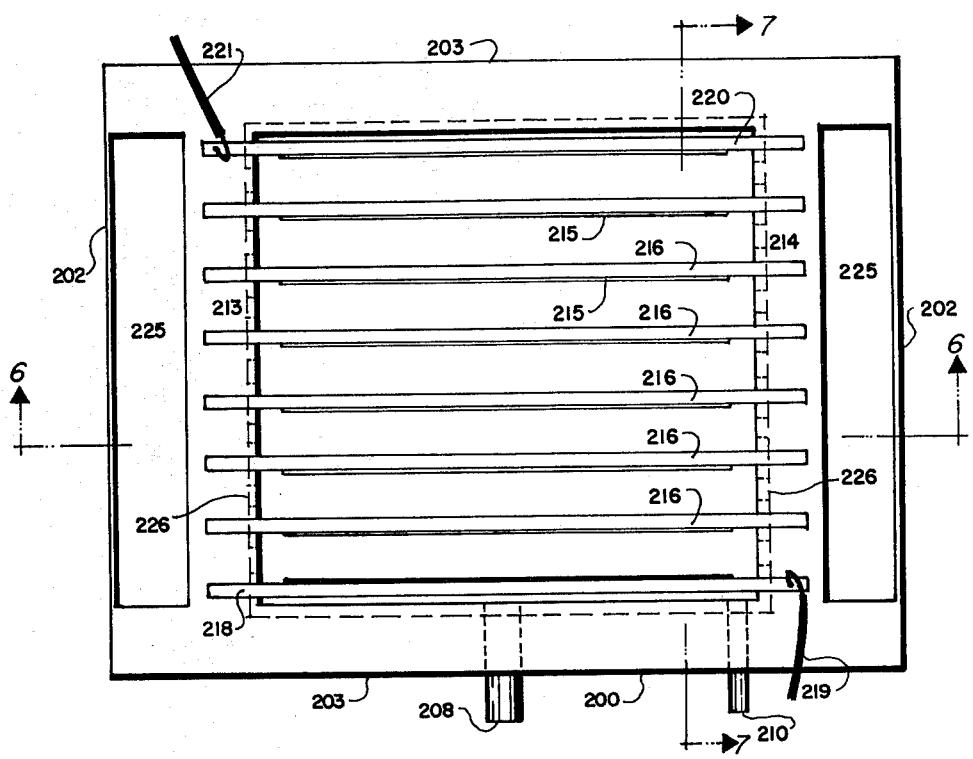
FIG. 5 is a fragmentary top view of the cell of FIG. 4 with the cover 211 removed.
Figure 6:
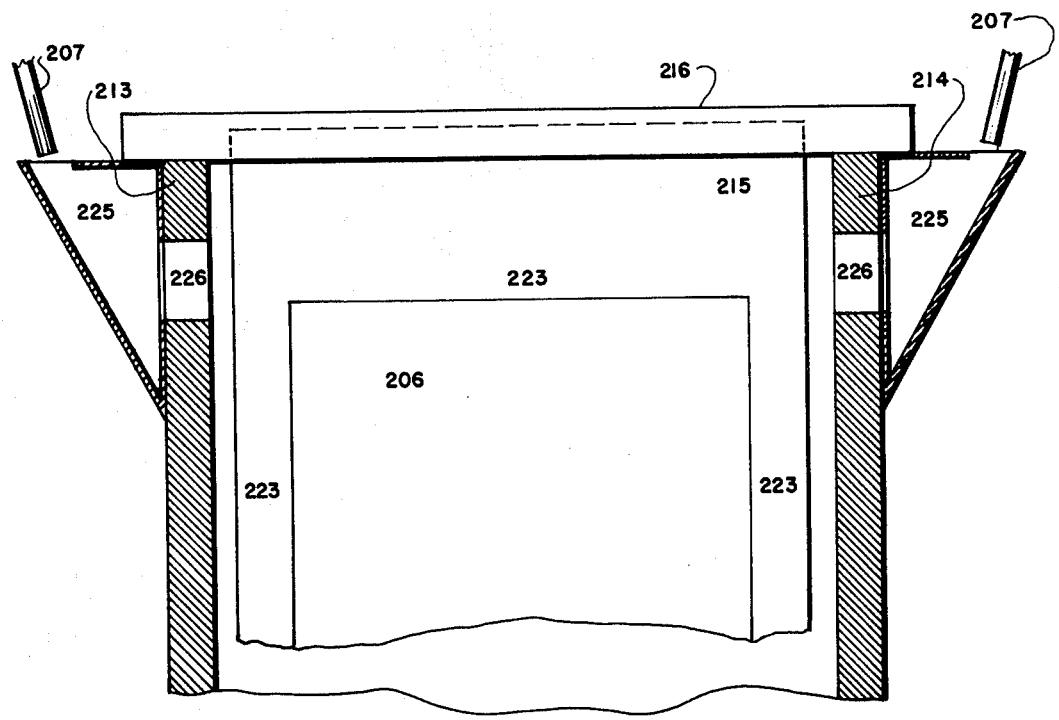
FIG. 6 is a fragmentary section taken on line 6—6 of FIG. 5 showing one of the plates 215.
Figure 7:
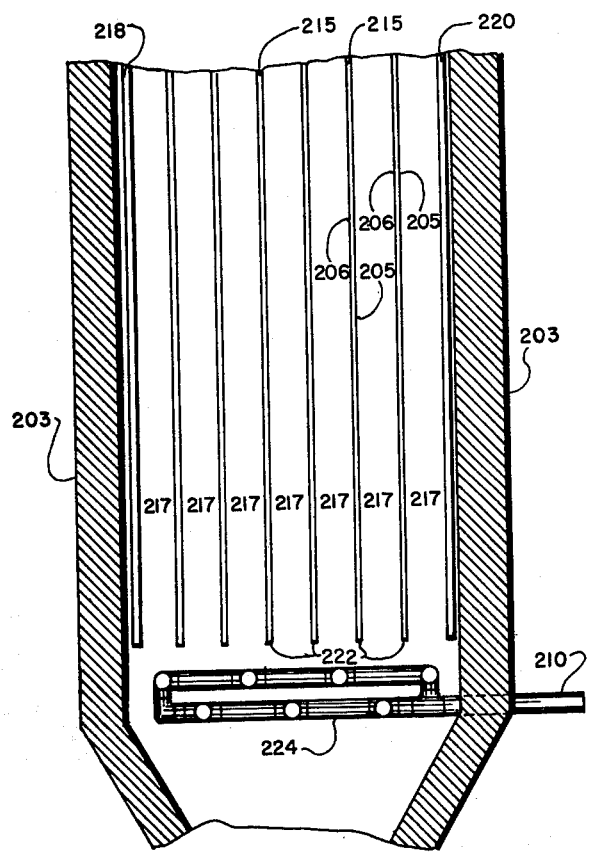
FIG. 7 is a fragmentary section taken on line 7—7 of FIG. 5 showing the gaps 217.

A novel continuous electroslurry winning cell according to the present invention is illustrated in FIGS. 4–7. Referring to FIG. 4, the cell can be generally described as a tank 200 having a relatively open top 201, sidewalls 202, end walls 203, and bottom 204 for containing a slurry of a suitable electrolyte and a suitable copper-bearing material, both defined supra. A plurality of paired cathodes 205 and anodes 206 are mounted in the tank 200 to be submerged by the slurry.

Attached to the tank preferably feeding to the open top 201 is a feed inlet means 207 for admitting to the tank 200 the copper bearing solids and electrolyte preferably as a slurry and admitting preferably at a plurality of points spaced along the sides 202. When employed as the cell 24 the inlet means 207 connects line 47 and 49 to the cell 24. An outlet means 208 is attached for discharging slurry from the tank 200 reduced in copper values as compared to the feed.

Agitation of the slurry within the tank is provided by recirculation of the slurry and gas agitation. A recirculating slurry is drawn from the tank through a recirculation outlet 209 attached to the tank 200 preferably at bottom 204 which is troughed for the purpose of keeping the solids of the slurry from settling when the slurry is recirculated. The recirculating slurry is preferably reintroduced to the tank 200 through the feed inlet means 207. A gas inlet means 210 is mounted to the tank to admit the gas preferably air via line 51 to the tank 200.

An optional cover 211 is mounted to seal the open top 201 from the atmosphere to allow recycling of the agitation gas after its escape from the slurry and to prevent escape to the atmosphere of any vapors and liquids entrained by the agitation gas. A gas outlet 212 is mounted to the sealed tank 200 above the liquid level of the contained slurry and preferably mounted to the cover 211 for discharging said gas for recycling via line 53.

The tank 22 also includes a nonconducting rack frame having two support members 213 and 214 extending along the sides of the tank 200 from end to end the length of the tank 200. Supported by the rack frame are a plurality of parallel uprightly disposed closely spaced apart plates 215 generally parallel to the end walls 203 with a support bar 216 across the top which is attached to the plates 215 by welds, bolts or the like. The support bar 216 has a width greater than the plates 215 such that when centered on the plates 215 the support bar 216 rests on the rack frame and the plates 215 are supported.

The plates 215 are thin, flat rectangular sheets having two faces and support paired cathodes 205 and anodes 206 such that they face each other across a gap 217 filled by the slurry between the spaced apart plates 215. The gap 217 can be in the range of about 1½–5 cm. Adjacent one end wall is a plate 218 which supports a cathode connected to the negative side 219 of an electrical potential means and adjacent the opposite end wall is a plate 220 which supports an anode connected to the positive side 221 of the electrical potential means such that an electrical potential can be applied across the slurry between the cathode plate 218 and anode plate 220.

The electrical potential when applied is distributed among the plates 215 between cathode plate 218 and anode plate 220. The plates 215 are preferably designed to have a cathode face 205 on the side nearest the anode plate 220 and an anode face 206 on the opposite side. The bottoms 222 of the plates 215 are free of baffles preventing agitation at the surfaces of the plate 215. The gap is preferably constant as an aid to agitation.

A conventional material for a plate serving solely as a anode is lead containing about 9% antimony. Plates which serve as a cathode 205 on one side and anode 206 on the opposite side require a wafer construction. The wafer can be constructed by coating one side of a titanium sheet serving as a plate 215 with precious metals such as platinum or rhodium or alternatively a titanium sheet serving as a plate 215 is coated with precious metal oxides, lead oxides or lead alloys.

Preferably the anode face opposite each cathode is of smaller surface area such that the cathode forms an overlap 223 with respect to the anode on all sides a noncritical distances of 4 cm if superimposed by eliminating the gap 217. If wafer sheets are used the overlap 223 can be provided by painting with a suitable nonconductive paint, a border about the anode face or by removing the active anodic material from the border. The overlap 223 improves the copper plate depositing on the cathode and also reduces the possibility of short circuits around the edges of the wafer.

The gas inlet means 210 admits the gas to a piping means 224 which distributes and emits the air from a plurality of points below the plates 215. The piping means 224 provided below the plates can be a series of pipes running parallel or perpendicular to the gaps 217. The gas agitation requirements are described supra in the cell description of the winning stage.

As shown in the Figures the feed inlet means 207 includes a plurality of feed points which are mounted in cover 211 and feeds slurry into side troughs 225 which feed the slurry into the main part of the tank 200 through aperatures 226.

We claim:

1. A system for preparing copper-bearing solids for electrowinning as a copper-bearing slurry and for electrowinning the slurry comprising:
   a. a means for leaching said copper-bearing solids with a moderately strong aqueous acid to solubilize non-copper metal ions into solution in the aqueous acid;
   b. a means for then adding an agent to the aqueous acid solution to reduce the copper ion concentration by forming copper-precipitate solids therein;
   c. a means for then separating the copper-precipitate solids and any remaining portions of said copper-bearing solids from the aqueous acid solution, thereby to form a first stream comprising a clear liquid and a second stream comprising a slurry containing said copper-precipitate solids and remaining portion of said copper-bearing solids;
   d. a tank mounted in flow communication with said separating means to receive a portion of the second stream including solids, said tank for containing a slurry of a suitable electrolyte and copper-bearing solids;
   e. inlet means providing the flow communication and mounted to admit the copper-bearing solids into said tank and outlet means for discharging copper-bearing solids diminished in copper value;
   f. a plurality of parallel uprightly disposed spaced-apart plates mounted in said tank, said plates having electrically conducting surfaces submerged in said slurry such that surfaces of adjoining plates face one another and are separated by a gap filled with slurry; and
   g. an electrical potential means for inducing an electrical current flow across the gaps between said faced surfaces.

2. The system of claim 1 additionally including apparatus for recovering copper and sulfur values from solids separated from slurry discharged from said outlet means of said tank in order that copper values can be returned to said tank comprising:
   a. a means for receiving solids from said tank and for slurrying said solids in an aqueous solution;
   b. a means for adding copper and sulfur collector reagents and frother agents to the aqueous solution of said receiving and slurrying means;
   c. a means for then separating said slurry between a third stream comprising floated copper, floated sulfur and solution and a fourth stream comprising a slurry containing the remaining solids;
   d. a means for then separating said floated copper and sulfur from the solution of said third stream, thereby to form a fifth stream of solution, and a first cake containing said floated copper and sulfur;
   e. a means for slurrying and then reacting said first cake in a slurry with ammonia gas and hydrogen sulfide gas to form soluble ammonium polysulfides;
   f. a means for then separating the slurried and reacted first cake, thereby to form a sixth stream comprising clear liquid containing ammonium polysulfides and a second cake containing copper solids; and
   g. a means for evaporating said sixth stream to generate ammonia gas, hydrogen sulfide gas and a slurry containing elemental sulfur.

3. The system of claim 2 further including apparatus for recovering said electrolyte, said apparatus located in the system between said tank and said receiving and slurrying means and comprising:
   a. a means for separating solids from the slurry discharged from said tank, thereby to form a seventh stream comprising clear liquid containing electrolyte and an eighth stream comprising a slurry containing said solids; and
   b. a means for recycling said seventh stream to said tank.

4. A system for leaching an aqueous slurry of copper-bearing solids to remove non-copper metal ions from the solids to produce a suitable feed of solids for an electrowinning cell comprising:
   a. a means fo leaching said copper-bearing solids with a moderately strong aqueous acid to solubilize non-copper metal ions into solution in the aqueous acid;
   b. a means for then adding an agent to the aqueous acid solution to reduce the copper ion concentration by forming copper-precipitate solids therein;
   c. a first means for then separating the copper-precipitate solids and any remaining portions of said copper-bearing solids from the aqueous acid solution, thereby to form a first stream comprising a clear liquid and a second stream comprising a slurry containing said copper-precipitate solids and remaining portion of said copper-bearing solids;
   d. a means for leaching said second stream with sufficient amounts of strong aqueous acid to decrease the pH of said second stream to below pH 2 thereby to solubilize additional non-copper metal ions into solution in the aqueous acid; and
   e. a second means for then separating the copper-precipitate solids and the remaining portion of said copper-bearing solids from the solution, thereby to form a third stream comprising clear liquid and a fourth stream comprising a slurry containing copper-precipitate solids and copper-bearing solids.

5. The system of claim 4 including a means for recycling said third stream of the separation to said moderate acid leach means.

6. The system of claim 4 wherein said first means for separating is a thickener and said second means for separating is a filter.

7. A system for recovering copper and sulfur values from solids separated from a slurry discharged from an electrowinning cell for electrowinning copper-bearing solids in order that said copper values can be returned to the electrowinning cell and said sulfur is available for generating sulfuric acid comprising:
- a. a means for receiving solids from an electrowinning cell and for slurrying said solids in an aqueous solution;
- b. a means for adding copper and sulfur collector reagents and frother agents to the aqueous solution of said receiving and slurrying means;
- c. a means for then separating said slurry between a first stream comprising floated copper, floated sulfur and solution and a second stream comprising a slurry containing the remaining solids;
- d. a means for then separating said floated copper and sulfur from the solution of said first stream, thereby to form a third stream of solution, and a first cake containing said floated copper and sulfur;
- e. a means for slurrying and then reacting said first cake in a slurry with ammonium gas and hydrogen sulfide gas to form soluble ammonium polysulfides;
- f. a means for then separating the slurried and reacted first cake, thereby to form a fourth stream comprising clear liquid containing ammonium polysulfides and a second cake containing copper solids; and
- g. a means for evaporating said fourth stream to generate ammonium gas, hydrogen sulfide gas and a slurry containing elemental sulfur.

8. The system of claim 7 additionally comprising:
- a. a means for recycling said second cake containing copper solids to the electrowinning cell;
- b. a means for concentrating said slurry containing elemental sulfur by removal of solution; and
- c. a means for separating said concentrated slurry, thereby to form sulfur dioxide gas and an ash.

9. The system of claim 8 wherein said means for separating said floated copper and sulfur from the solution of said first stream, is a filter and said means for separating the slurried and reacted first cake is a filter.

10. The system of claim 9 wherein said means for concentrating said slurry containing elemental sulfur by removal of solution is a filter and said means for separating said concentrated slurry, thereby to form sulfur dioxide gas and an ash is a furnace.

* * * * *

UNITED STATES PATENT AND TRADEMARK OFFICE
CERTIFICATE OF CORRECTION

PATENT NO. : 4,096,053
DATED : June 20, 1978
INVENTOR(S) : Robert C. Emmett, Jr. et al.

It is certified that error appears in the above-identified patent and that said Letters Patent are hereby corrected as shown below:

IN THE SPECIFICATION:

In column 5, line 49, delete "1.5-20% and insert -- 0.5-20% --.

In column 5, line 66, delete "1.6-1" and insert -- 0.6-1 --.

IN THE CLAIMS:

In column 14, line 9, delete "ammonium" and insert -- ammonia --.

Signed and Sealed this

Eighth Day of January 1980

[SEAL]

Attest:

SIDNEY A. DIAMOND

Attesting Officer     Commissioner of Patents and Trademarks